(12) United States Patent
Wang et al.

(10) Patent No.: US 7,504,630 B2
(45) Date of Patent: Mar. 17, 2009

(54) METHOD AND APPARATUS FOR ATTENUATING A LIGHT BEAM

(75) Inventors: Xingzhong Wang, Cupertino, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 66 days.

(21) Appl. No.: 11/835,385

(22) Filed: Aug. 7, 2007

(65) Prior Publication Data
US 2009/0039265 A1 Feb. 12, 2009

(51) Int. Cl.
*G01J 5/62* (2006.01)
(52) U.S. Cl. .................. 250/338.1; 385/19; 385/140
(58) Field of Classification Search .......... 250/338.1; 385/19, 140
See application file for complete search history.

(56) References Cited

U.S. PATENT DOCUMENTS

| 4,063,096 A | * | 12/1977 | Roberts | .................. 250/343 |
| 2004/0037493 A1 | * | 2/2004 | Lee et al. | .................. 385/18 |
| 2004/0126080 A1 | * | 7/2004 | Hong et al. | .................. 385/140 |

* cited by examiner

*Primary Examiner*—David P Porta
*Assistant Examiner*—Marcus H Taningco
(74) *Attorney, Agent, or Firm*—Joe Zheng

(57) ABSTRACT

Attenuators used to regulate optical signals are disclosed. According to one aspect of the present invention, an assembly including an IR source and an IR sensor is provided to sense blockage of optical signals transmitted between two collimators via a fixed common light blocker. The movement of the light blocker is sensed by a sensing assembly including an IR source and IR sensor. By detecting the photocurrent from the IR sensor and a feedback circuit, the attenuation of the optical signals can be well controlled.

18 Claims, 10 Drawing Sheets

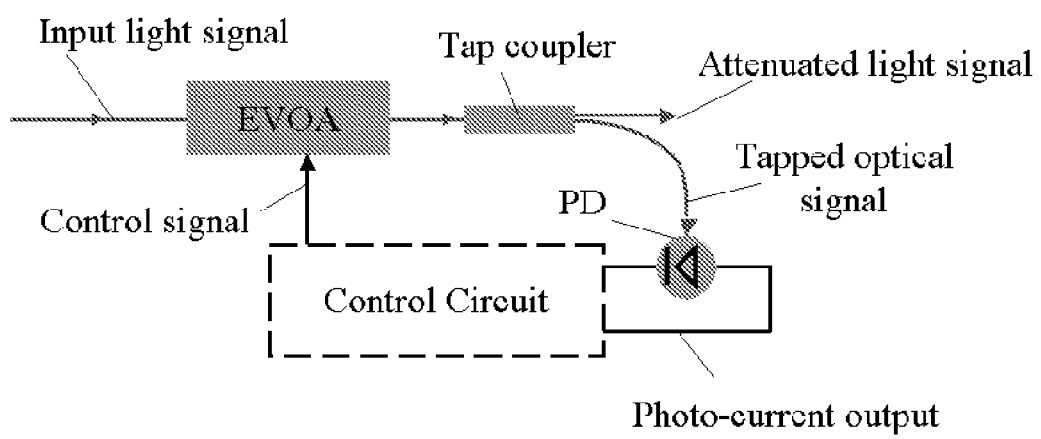
(a)
(Prior Art) FIG. 1A

(b)

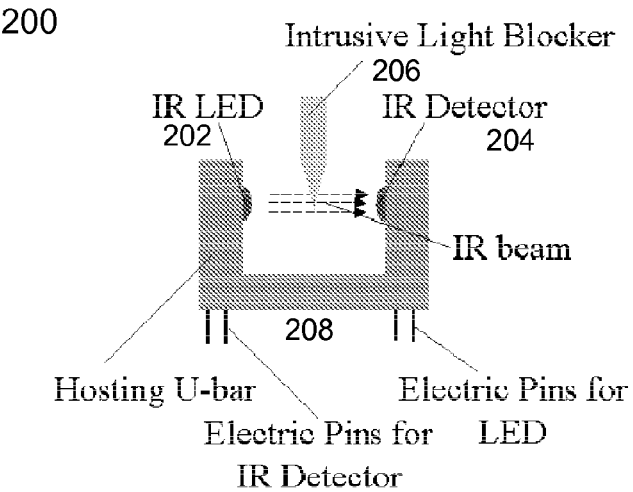 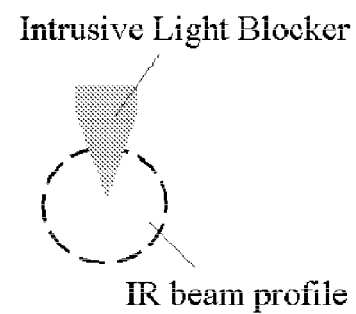
*FIG. 2A*  *FIG. 2B*

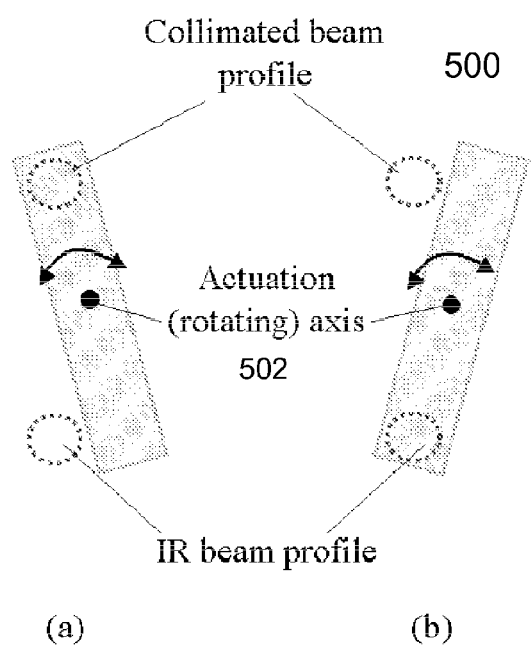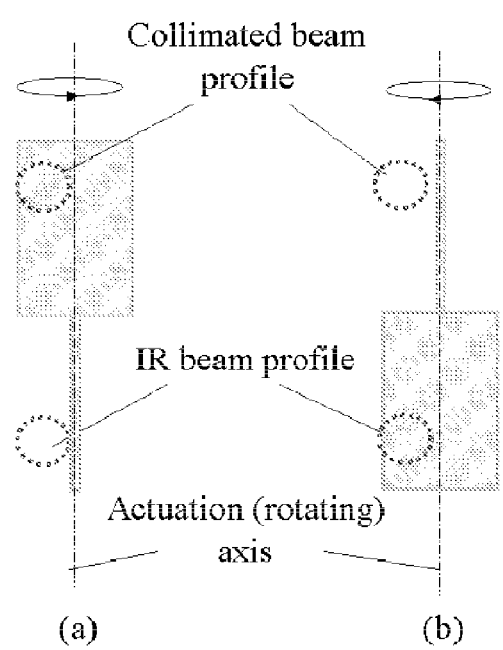
FIG. 5                    FIG. 6

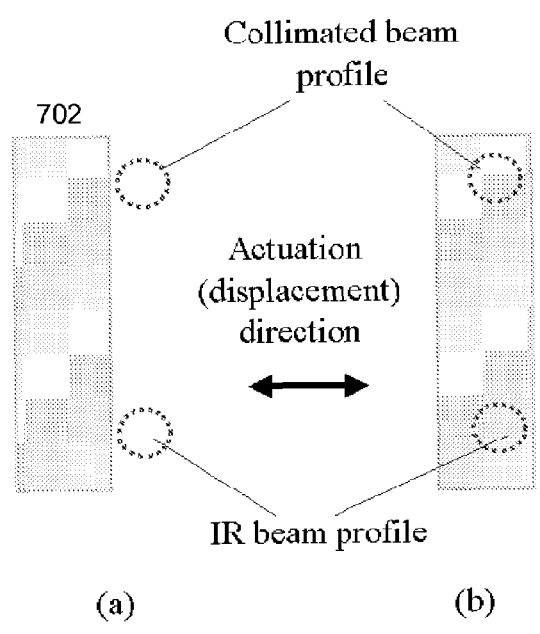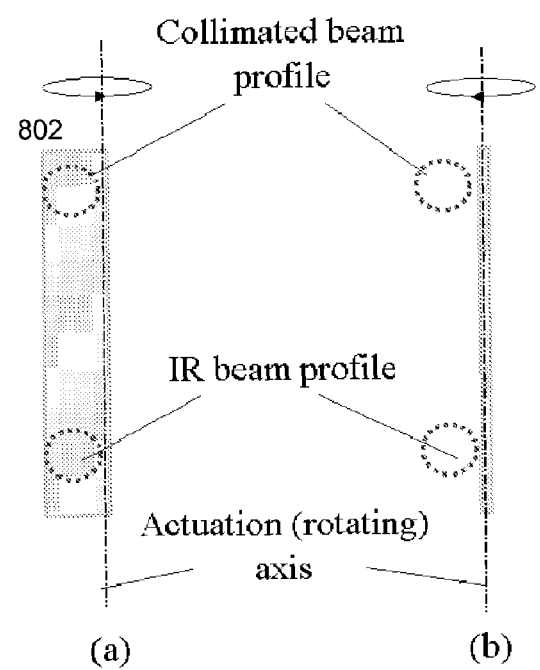
FIG. 7
FIG. 8

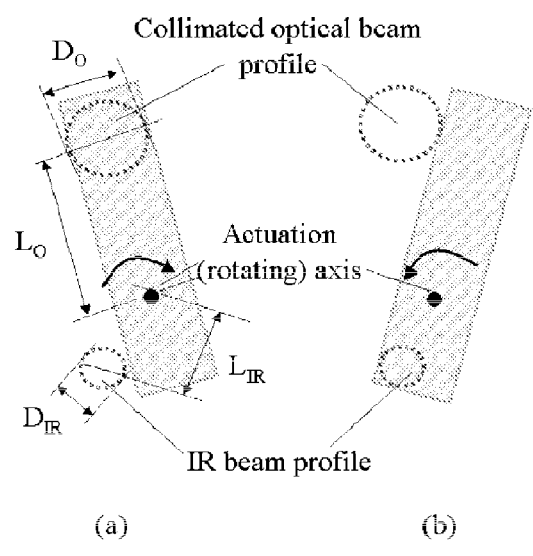 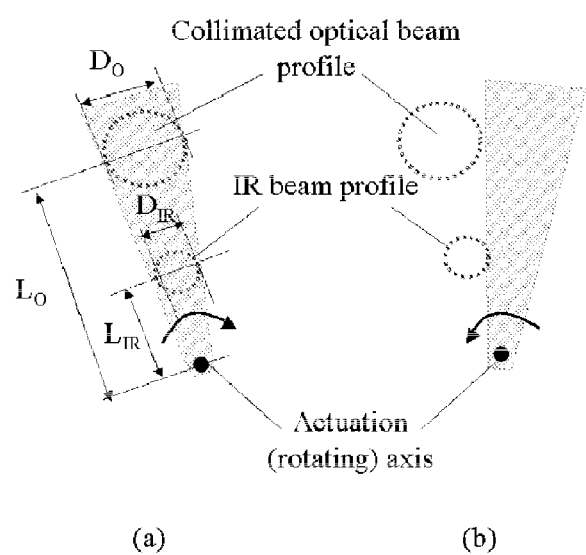
FIG. 10  FIG. 11

METHOD AND APPARATUS FOR ATTENUATING A LIGHT BEAM

BACKGROUND OF THE INVENTION

1. Field of the Invention

The invention is generally related to the area of optical communications. In particular, the invention is related to a method and apparatus for regulating a light beam signal with a sensor-based attenuator.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networks.

In general, the channel signals come from different sources and may have transmitted over different mediums, resulting in different power levels. Without equalizing the power levels of the channel signals that are to be combined or multiplexed, some channels in a multiplexed signal may be distorted as a result of various stages of processing the multiplexed signal. On the other hand, many optical devices or systems would not function optimally when incoming signals are beyond a pre-determined signal level range. In fact, the power of the incoming signals shall not be too low, neither too high. To ensure that all optical devices or systems receive proper levels of optical signals, attenuation devices are frequently used to adjust the optical signals before they reach an optical device.

Many existing optical attenuation devices are open loop controlled due to lack of internal accuracy feed back signal. An electrical tuning variable optical attenuator (EVOA) is capable of quickly controlling the optical signal power. However, many of EVOA developed so far are either based on MEMS, or by moving a ND filter driven by a stepping motor with gear reduction mechanics and a potentiometer for positions, or waveguide based VOAs. While the ND filter based approach suffers from a slow adjustment speed and a high cost of components such as the ND filter and supporting optics, the MEMS or other non-ND-filter approaches typically are too sensitive to have a fine attenuation resolution, and good device assembly repeatability. Waveguide VOAs are suitable for high channel-count integration, but have the issues of high polarization dependent loss, sensitive to ambient temperature. Their use in an open loop control often results in these undesired issues, such as high temperature-dependent loss, performance and reliability issues, rendering the shortening of their service life cycle.

To solve most of these issues, a closed-loop control has been applied by adding an EVOA and a tap optical filter or coupler together with a photo-detector (PD) as a sensor, as shown in FIG. 1A and FIG. 1B, respectively. The combination of tap and PD generates a small photocurrent proportional to the output intensity from the EVOA. Such a current serves as a feedback signal to further adjust the EVOA so as to meet the attenuation requirement. Such a tap-PD based EVOA design is often adopted in many optically devices or systems. However, the external feed-back mechanism makes an overall system higher in cost and introduces higher insertion loss and often makes the final system bulky.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of attenuators that can be advantageously used to regulate optical signals according to pre-defined requirements. According to one aspect of the present invention, an assembly including an IR source and an IR sensor is provided to sense blockage of optical signals transmitted between two collimators via a fixed common light blocker. By detecting the photocurrent from the IR sensor and a feedback circuit, the attenuation of the optical signals can be well controlled.

Various designs of the common light blocks are disclosed. Depending on the designs and operations of the common light blocks, the attenuators in accordance with the present invention provide what is referred to herein as complementary attenuation or reverse attenuation, each leading to different benefits and features.

There are numerous benefits, features, and advantages in the present invention. One of them is the controlled and precise attenuation via an IR sensor with a feedback control so as to compensate for some environmental factors such as temperature changes, and vibration.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1A and FIG. 1B show, respectively, an EVOA using a tap optical filter or coupler together with a photo-detector (PD) as a sensor;

FIG. 2A shows an exemplary sensing assembly that can be used in one embodiment of the present invention;

FIG. 2B illustrates an IR beam being intruded;

FIG. 5A and FIG. 5B show, respectively, two movements, which demonstrates that a common light blocker has a rotational axis as indicated;

FIG. 6A and FIG. 6B show together another embodiment of rotating a common light blocker about an axis;

FIG. 7A and FIG. 7B show what is referred to herein as reverse attenuation;

FIG. 8A and FIG. 8B shows another embodiment providing the reverse attenuation relationship;

FIG. 10A and FIG. 10B show, respectively, two extreme cases in which an opaque plate is rotated around an axis that provides a level of mechanical amplication; and FIG. 11A and FIG. 11B show, respectively, two extreme cases in which an opaque plate is designed to carry a level of mechanical amplication.

DESCRIPTION OF THE PREFERRED EMBODIMENTS

Figure 1B:
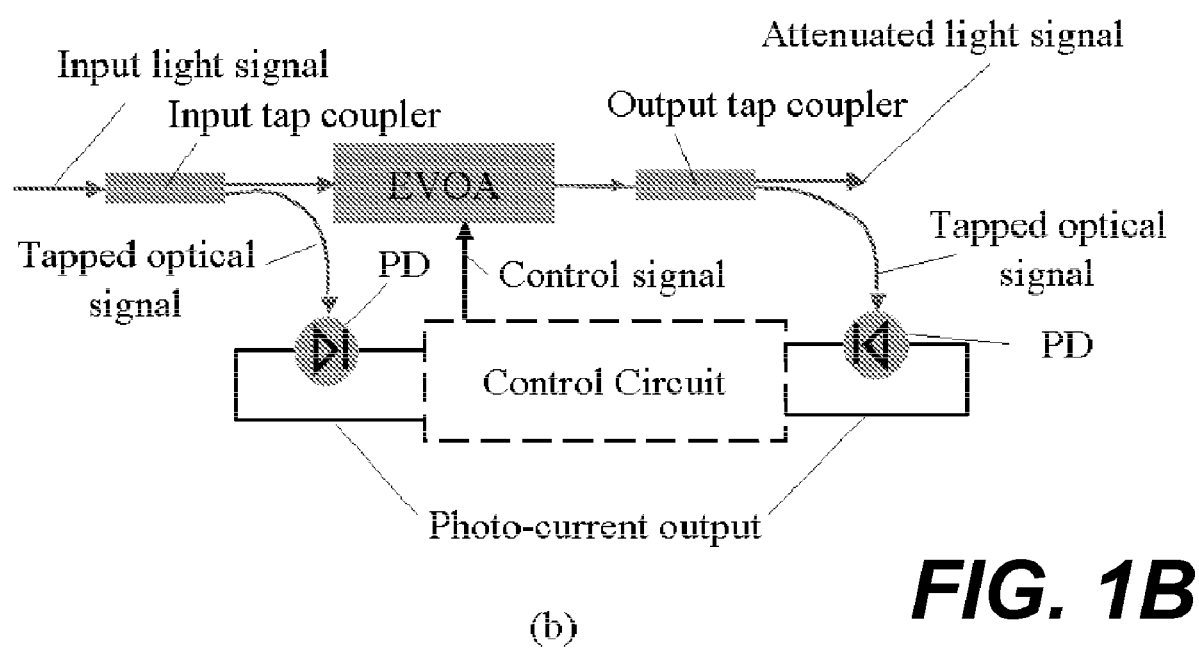
Figure 3:
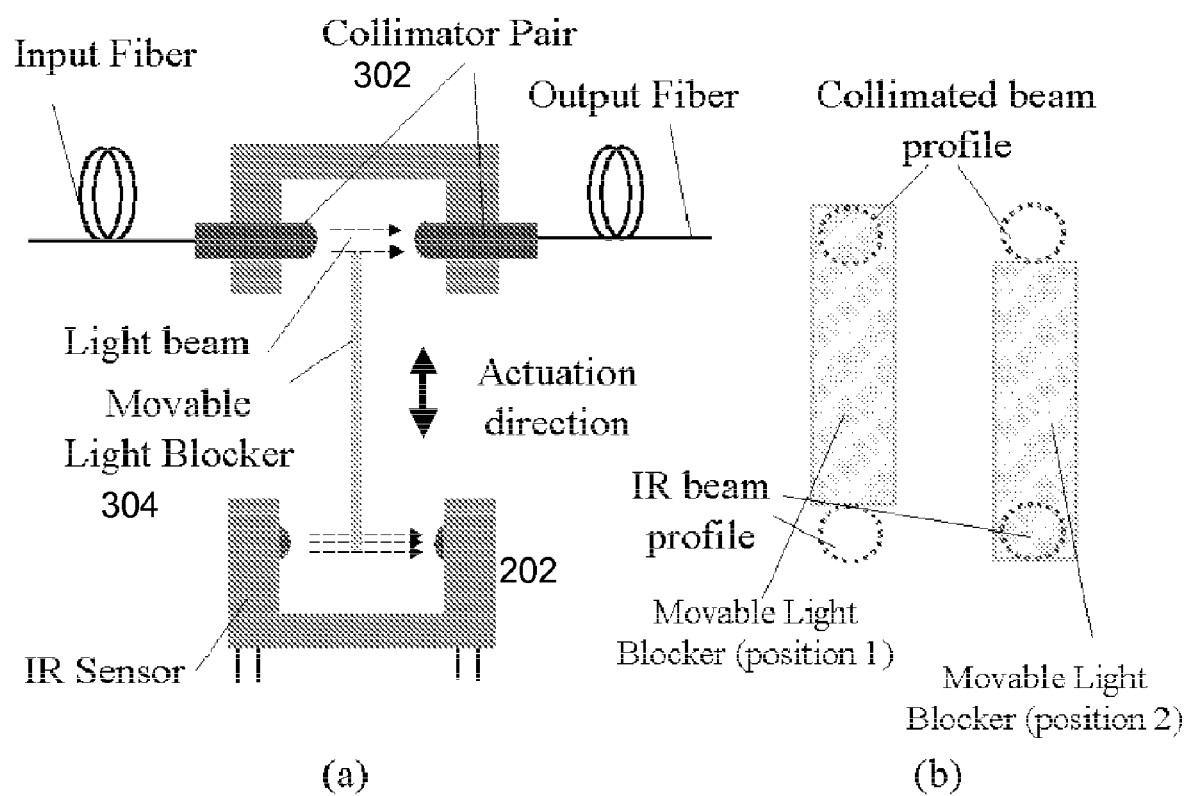
FIG. 3A shows an exemplary embodiment of a VOA employing the assembly of FIG. 2A in accordance with the present invention.
FIG. 3B illustrates two extreme cases of FIG. 3A.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-11B. However, those skilled in the art will readily appreciate that the detailed description given herein with respect to these figures is for explanatory purposes as the invention extends beyond these limited embodiments.

FIG. 2A shows an exemplary assembly 200 that can be used in one embodiment of the present invention. The assembly 200, also referred to as a sensing assembly, includes an infrared (IR) LED 202, a commercial low-cost and compact infrared (IR) sensor 204, and an intrusive light blocker 206. To position the LED 202 and the sensor 204 properly, a U-shaped structure 208 is used so that a fixed distance between the LED 202 and the sensor 204 is always maintained. In one embodiment, the LED 202 and the sensor 204 are housed in a molded compact plastic enclosure that may be massively manufactured and deployed in various environments, such as cars, home appliances, home electronics and office appliances.

The intrusive light blocker 206 can be driven downwards or upwards. When the intrusive light blocker 206 is present in an optical path from the LED 202 to the sensor 204, at least some of the IR beam from the LED 202 will be blocked. The sensor 204 generates a stable photocurrent proportional to the amount of the power of an IR beam being detected by the sensor 204. Depending on how much the blocker 206 is inserted into the way of the IR beam, the sensor 204 reports a changed photocurrent proportional to the amount of the IR beam being blocked. Thus, the IR sensor 206 can be used to track a one-dimensional movement of an object (e.g., the intrusive light blocker 206) if the shape of such an object is known and fixed.

To better illustrate the operation of the IR sensor 204, FIG. 2B shows a projected view of a round IR beam profile along with a light blocking object partially inserted. As the object 206 moves vertically down into the beam, the amount of the IR beam blocked will change from none to all, and the corresponding photocurrent from the IR Sensor (e.g., through its output pin) will be from a maximum value to zero. For a known object, this monotonic change of the photocurrent can then be used to calculate the position of the object (namely, the intrusive light blocker's vertical position) when the shape thereof is known and fixed.

Based on the assembly 200, a variable optical attenuator (VOA) may be constructed according to one embodiment. FIG. 3A shows an exemplary embodiment 300 of a VOA employing the assembly 200. The VOA 300 includes a pair of fiber optic collimators 302. The two collimators 302 are kept away from each other by a fixed distance (namely there is a free space gap between them). One of the two collimators 302 projects a collimated beam to another one of the collimators 302. A common light blocker 304 is provided and actuated by an actuation means (e.g., a motor) to be moved up and down. As shown in FIG. 3A and FIG. 3B, when the common light blocker 304 is moved up, the collimated beam transmitted between the two collimators 302 is gradually blocked. On the opposite, when the common light blocker 304 is moved down, the collimated beam transmitted between the two collimators 302 is gradually released from being completely blocked to not being blocked at all. FIG. 3B shows two extreme cases in which the common light blocker 304 is moved up to completely block the light beam and moved down to completely unblock the light beam. The embodiment in FIG. 3A is one of the embodiments providing complimentary attenuation control.

Specifically, on the left side of FIG. 3B, the common light blocker 304 is at its most top position fully blocking the light beam from one of the fiber collimators and thus the VOA outputs a "dark" state (namely the other one of the fiber collimators receives nothing). At this position, the IR sensor is fully open and its photo-current reaches a maximum value. Conversely, the common light blocker 304 can be actuated to move vertically downward to let a portion of the collimated light beam reach the other one of the collimators and at the same time, the IR sensor will be partially blocked or its photo-current is reduced from the previous level. On the right side of FIG. 3B, the common light blocker 304 is placed at the most bottom position where the light beam is coupled from one of the collimators to another with no attenuation. At the same time, the IR sensor reaches its "dark" state with no photocurrent. This relationship between the light attenuation of the VOA and the magnitude of the photocurrent from the IR sensor can be a fixed. In one embodiment, the relationship is stored in a control circuit or device as a reference to correct a light blocking status if the movement introduced an error. The relationship can also be used to calculate how much attenuation has been introduced to the light beam.

Figure 4A:
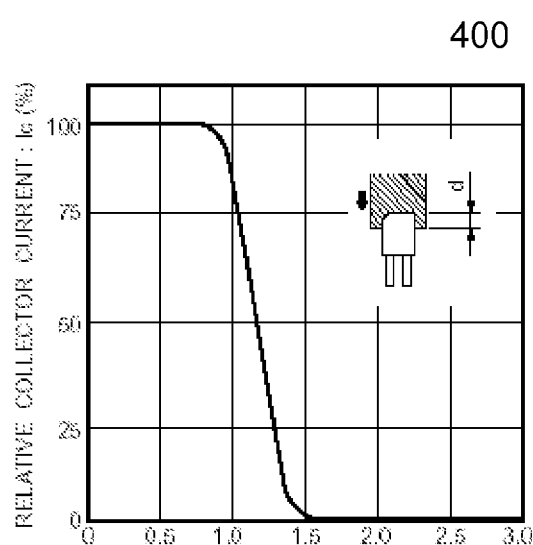
FIG. 4A shows an exemplary photocurrent curve.
Figure 4B:
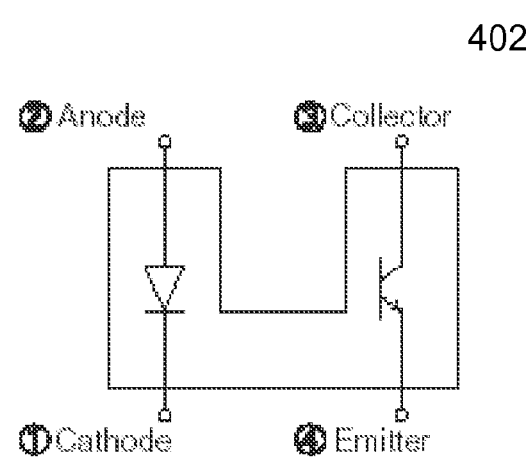
FIG. 4B shows a corresponding electronic structure of the assembly of FIG. 2A.
Figure 9:
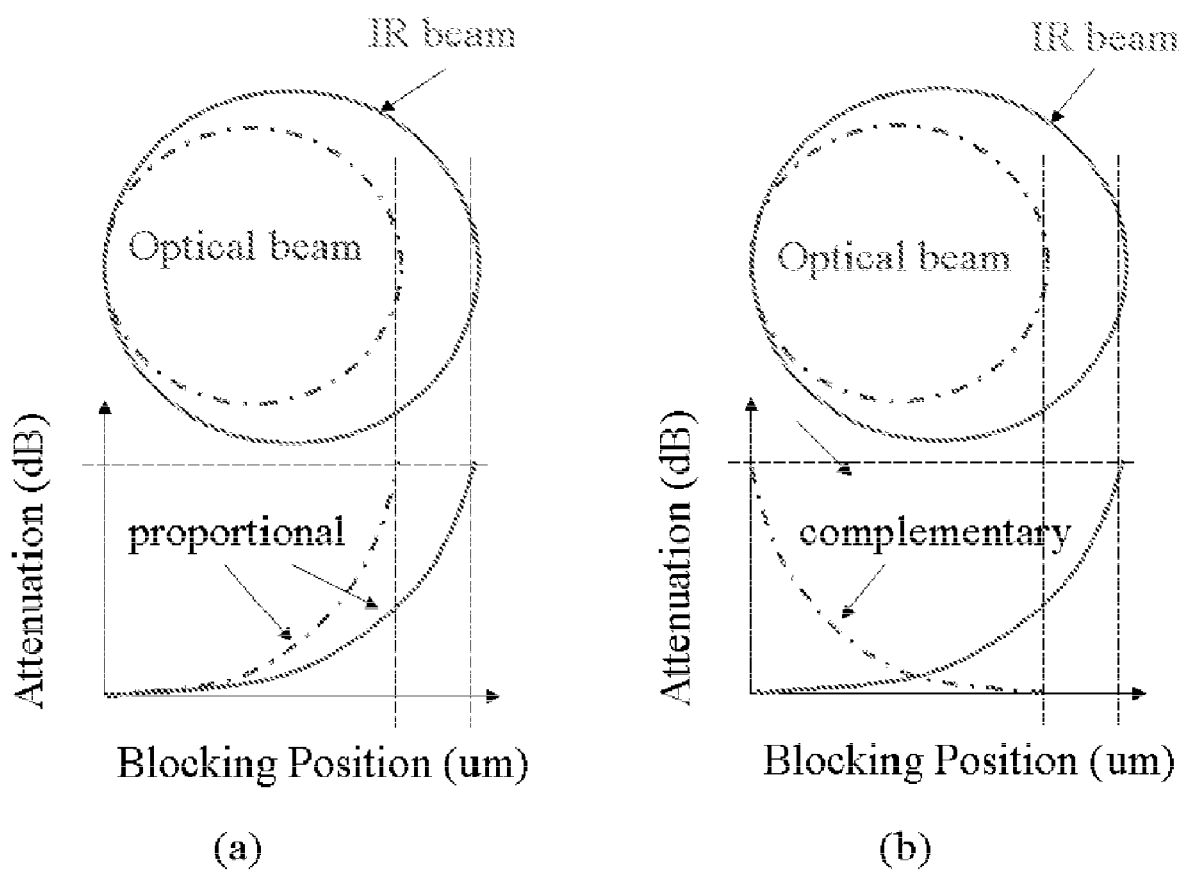
FIG. 9A and FIG. 9B show, respectively, two cases in which the diameter of the IR beam is either larger or smaller than that of the optical beam.
Figure 12:
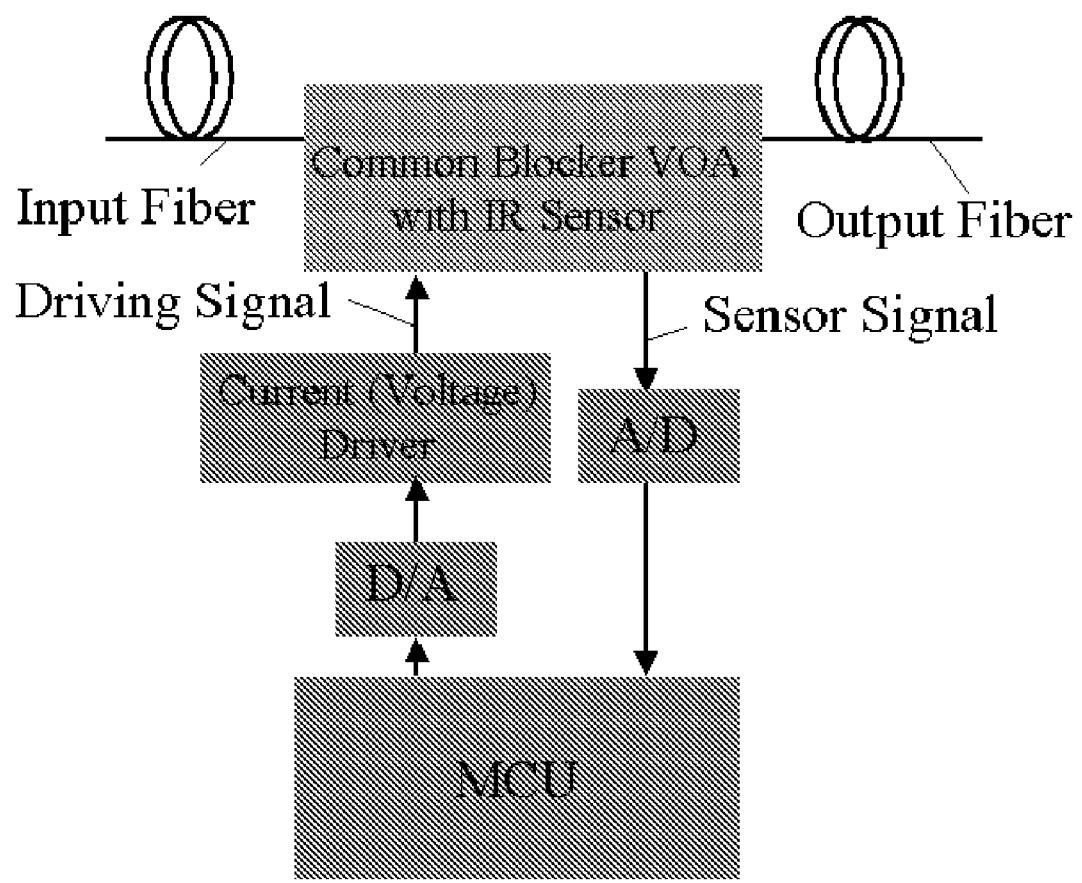

FIG. 4A shows an exemplary photocurrent curve 400 and FIG. 4B shows the corresponding electronic structure 402 of the assembly 200 of FIG. 2A. What is not shown in FIG. 4A is that a feed-back loop (e.g., a circuit) in which the photo-current can be processed and used to control the movement of the common light blocker 304 to refine the attenuation through some miner blocker position adjustment.

In another embodiment of the invention, the common light blocker 304 is actuated with rotational movement such as by a DC motor or stepping motor. FIG. 5A and FIG. 5B show, respectively, two movements, which demonstrates that a common light blocker has a rotational axis as indicated. The light blocking is performed complementarily in the same way as described above. On the left side of FIG. 5B, the common light blocker 502 rotates anticlockwise so that the light beam from the collimator is blocked while the IR beam goes directly to the IR sensor so that a maximum value of the photocurrent from the IR sensor is produced. On the right side of FIG. 5B, the common light blocker 502 rotates clockwise so that the light beam from the collimator is unblocked while the IR beam is blocked so that a minimum value of the photocurrent from the IR sensor is produced.

FIG. 6A and FIG. 6B show together another embodiment of rotating a common light blocker about an axis. The common light blocker includes two opaque plates positioned along an axis but orthogonally. So when one plate is blocking the light bean from the collimator, the other plate is not blocking the IR beam as shown in FIG. 6A. Similarly, when one plate is not blocking the light bean from the collimator, the other plate is blocking the IR beam as shown in FIG. 6B. Depending on the relative positions of the collimators and IR source and sensors, the common light blocker can have two fixed parts with an angle between them so that the rotation of the two fixed parts allows one beam to be blocked while the other passes. Those skilled in the art can appreciate that various designs surrounding this embodiment may be made to perform this complementary blocking function.

FIG. 7A and FIG. 7B show what is referred to herein as reverse attenuation. An opaque plate 702 is actuated with translational movement. In operation the plate 702 moves in to gradually block both the collimated light beam and the IR beam at the same time. Given the photocurrent from the IR sensor, it can be readily determined how much attenuation has been introduced to the collimated light beam. Specifically, FIG. 7A shows an extreme case in which the opaque plate 702 does not block anything. The opaque plate 702 is then attenuated to block some or all of the collimated light and the IR beam. FIG. 7B shows an extreme case in which the opaque plate 702 blocks both of the collimated light and the IR beam.

FIG. 8A and FIG. 8B shows another embodiment with the reverse relationship. An opaque plate 704 is mounted on a rotating axis. FIG. 8A shows that the opaque plate 704 is rotated to a position that blocks both of the collimated light and the IR beam. FIG. 8B shows that the opaque plate 704 is rotated to a position that does not block any of the collimated light and the IR beam. It can be understood that that the opaque plate 704 is rotated to a position that if the opaque plate 704 is rotated to a position between the two extreme cases shown in FIG. 8A and FIG. 8B, some portion of the collimated light and the IR beam will be blocked. In any case, based on the photocurrent from the IR sensor, it can be readily calculated how much attenuation has been introduced into the collimated light.

In reality, the IR beam and the collimated beam may not have an identical size (e.g., diameter) and thus the difference needs to be considered in order to optimize the performance. In FIG. 9A, it is assumed that the diameter of the IR beam size is larger than that of the collimated beam, two sets of curves are drawn to illustrate the proportional and the complementary relationships of the blocker. As shown in FIG. 9A, to reach to the same attenuation level, the larger beam would require a larger linear movement to cover the beam. In this case, the IR beam may not be fully blocked if there is an identical movement the common blocker in and out of the beam by translation of. The IR beam or the sensor signal curve may not be so steep when fine tuning the collimated beam at higher attenuation and thus its resolution may not be the same when controlling the high vs. low attenuation region of the VOA.

FIG. 9B shows a situation where a complementary relationship presents, the IR sensor is in the most sensitive state while the optical attenuation is at the low attenuation. On the other hand, When collimated signal is at the high attenuation state, the IR sensor is at a rather poor resolution state. Thus care must be exercised to match up the resolution to deliver the desired performance. Although plots of the situation where the diameter of the IR beam is smaller than that of the collimated beam are nor presented, those skilled in the art are readily ro produce these given the description herein.

In order to enable the common blocker to block both of the IR beam and the collimated beam of different profile diameters with substantially similar rate (resolution), in one embodiment, the light blocker actuation is considered to include an amplification factor. For example, for a situation where the IR sensor has a smaller beam profile diameter $D_{IR}$ while the VOA's collimated beam has a larger beam diameter $D_O$. To use a simple actuator to block both beams at the same rate, the blocker and actuator combination must use an amplification factor. In FIG. 10 and FIG. 11, simple amplification mechanisms are shown for the complementary and the portional blockings, respectively.

In particular, FIG. 10A shows that the rotation point in the opaque plate 902 is not in the middle. Because the diameter profile of the IR beam is smaller than that of the collimated beam, the rotation point is located towards the IR beam. As a result, the rotation of the opaque plate 902 towards the collimated beam is amplified. Those skilled in the art can appreciated that the rotation point can be precisely located in reference with the diameter profiles of the collimated and the IR beams. FIG. 10A shows an extreme case in which the collimated beam is fully blocked while the IR beam is not blocked. FIG. 10B shows an opposite extreme case in which the collimated beam is not blocked while the IR beam is fully blocked.

FIG. 11A shows another mechanical amplification in which the opaque plate 904 is shaped proportionally with the diameter profiles of the collimated and IR beams. As a result, when the opaque plate 904 rotates, the blocking is achieved with fairly equal rate on both of the collimated beam and the IR beam. FIG. 11A shows an extreme case in which the collimated beam is fully blocked while the IR beam is not blocked. FIG. 11B shows an opposite extreme case in which the collimated beam is not blocked while the IR beam is fully blocked.

Regardless how the opaque plate is rotated, amplification factor is generated using different arm lengthens measured, respectively, from the rotating axis of the blocker to the center of the larger ($L_O$) beam and from the rotating axis of the blocker to the smaller ($L_{IR}$) beam center locations. It can be shown that the amplification can be achieved by putting the rotation axis or the arm length ratio between the two blocking positions with a relation The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim:
1. An attenuator comprising:
    a first collimator and a second collimator, the first and second collimators being positioned rigidly to maintain a fixed distance therebetween;
    a sensing assembly including an IR source and an IR sensor;

a light blocker actuated to block some or all of a light beam projected from the first collimator to the second collimator according to an attenuation requirement, wherein a movement of the light blocker is sensed by the sensing assembly to indicate how much the light beam has been attenuated.

2. The attenuator as recited in claim 1, wherein the light beam is not being branched out for measuring how much the light beam has been attenuated.

3. The attenuator as recited in claim 1, wherein the sensing assembly is a rigid structure that maintains a fixed distance between the IR source and the IR sensor.

4. The attenuator as recited in claim 3, wherein the movement of the light blocker causes some or all of an IR beam projected from the IR source to the IR sensor.

5. The attenuator as recited in claim 4, wherein the IR sensor produces a photocurrent proportional to an amount of the IR beam being blocked.

6. The attenuator as recited in claim 4, wherein the IR sensor produces a photocurrent proportional to an amount of the IR beam projected from the IR source to the IR sensor.

7. The attenuator as recited in claim 4, wherein some or all of the IR beam is being blocked by the light blocker when some or all of the light beam is being unblocked by the light blocker.

8. The attenuator as recited in claim 7, wherein the movement of the light blocker is translational.

9. The attenuator as recited in claim 7, wherein the movement of the light blocker is rotational.

10. The attenuator as recited in claim 7, wherein the movement of the light blocker is regulated accordingly to a difference in diameters of the light beam and the IR beam.

11. The attenuator as recited in claim 7, wherein the movement of the light blocker is mechanically adjusted to maintain the light beam to be attenuated with a predefined resolution.

12. The attenuator as recited in claim 7, wherein the movement of the light blocker is mechanically adjusted to maintain the IR beam to be blocked with a predefined resolution.

13. The attenuator as recited in claim 4, wherein some or all of the IR beam is being blocked by the light blocker when some or all of the light beam is also being blocked by the light blocker.

14. The attenuator as recited in claim 13, wherein the movement of the light blocker is translational.

15. The attenuator as recited in claim 13, wherein the movement of the light blocker is rotational.

16. The attenuator as recited in claim 13, wherein the movement of the light blocker is regulated accordingly to a difference in diameters of the light beam and the IR beam.

17. The attenuator as recited in claim 13, wherein the movement of the light blocker is mechanically adjusted to maintain the light beam to be attenuated with a predefined resolution.

18. The attenuator as recited in claim 13, wherein the movement of the light blocker is mechanically adjusted to maintain the IR beam to be blocked with a predefined resolution.

* * * * *